United States Patent Office 3,281,243
Patented Oct. 25, 1966

3,281,243

LITHOGRAPHIC PRINTING SURFACE

Jack L. Sorkin, University Heights, Ohio, and Daniel C. Thomas, Covina, Calif., assignors to Harris-Intertype Corporation, Cleveland, Ohio, a corporation of Delaware No Drawing. Filed Dec. 20, 1965, Ser. No. 515,143
9 Claims. (Cl. 96—86)

This application is a continuation-in-part of our copending application, Serial No. 74,780, filed December 9, 1960, entitled "Lithographic Printing Surface," now U.S. Patent No. 3,231,376, issued January 25, 1966.

This invention relates generally as indicated to a lithographic printing surface and more particularly to a lithographic plate base having a novel intermediate or barrier layer thereon.

In the preparation of lithographic plates, a light-sensitive coating is provided on the surface of a support member which is subsequently exposed to light through a transparency, stencil, negative or the like. The selected areas of the light-sensitive coating so exposed undergo a reaction thus providing a surface having a differential solubility in the light-exposed and unexposed areas. The plate may then be developed with a suitable solvent to remove the undesired areas and thus form the desired image on the surface.

To be acceptable commercially, lithographic plates must be capable of producing many thousands of impressions. In prior plates, the hydrophilic areas provided by the bare metal of the plate tended to lose their water-attractiveness after a period of time. When this occurs, the plate begins to pick up ink in these areas so that "scumming" of the plate results, and accordingly, copies printed from the plate are of unacceptable quality.

In an effort to minimize scumming and thus lengthen the useful life of the plate, various materials have been used as a hydrophilic intermediate or barrier layer between the support member and the light-sensitive coating. To be an acceptable barrier layer, such material must, of course, be hydrophilic and incapable of undergoing a harmful reaction with the light-sensitive material. A suitable sublayer must also be capable of receiving and retaining the light-sensitive material prior to exposure and development and of releasing certain areas of the light-sensitive coating after light exposure while firmly retaining such material in other areas.

With the diazo light-sensitive materials, there is also the additional objection that many such compounds react chemically with the metal surfaced plates with which they are normally used. Consequently, whenever a diazo material is used as the light-sensitive coating, it is necessary to include a hydrophilic sublayer which completely and effectively seals the metal surface from the diazo material and accordingly prevents chemical reaction therebetween.

In recent years, the use of various diazo materials as the light-sensitive coating has become quite popular, because a completely "presensitized plate" may be prepared which can be stored in light-excluding packages for several months prior to use. At that time, the plate is simply converted to the desired printing plate by exposure to a light source in the typical fashion and thereafter developed to form the desired image. To enhance the quality and to improve the storage life of such plates, it is extremely important that a sublayer having the indicated characteristics be provided between the plate base and light-sensitive coating to preclude deterioration or decomposition of the diazo material through contact and reaction with the metal surface.

Another common practice which is presently used quite extensively is to prepare a plate having the desired hydrophilic sublayer thereon but without the overlying light-sensitive coating. Plates of this type are purchased by printers and are used whenever necessary by merely wiping on a solution of light-sensitive material, and after drying, the plate is then ready for light exposure. Accordingly, such plates have become known in the art as "wipe-on plates." Since the hydrophilic layer is exposed to the atmosphere in plates of this type and is not protected by an overlying layer of light-sensitive material, as in the case of presensitized plates, certain of the sublayers which have been previously provided have been found to deteriorate after a period of time and lose their hydrophilic character.

It is a principal object of the present invention therefore to provide a lithographic printing surface which includes a novel barrier layer.

It is another object of this invention to provide a lithographic plate with an intermediate or barrier layer which will provide a complete and effective seal for a metal surfaced plate from a light-sensitive diazo compound.

Yet another object of this invention is the provision of a lithographic plate in which the intermediate layer is the reaction product of a hydroxylated metal surface and a metal ester.

Other objects, features and advantages of this invention will become apparent to those skilled in the art after a reading of the following more detailed description.

To the accomplishment of the foregoing and related ends, the invention, then, comprises the features hereinafter fully described and particularly pointed out in the claims, the following description of the invention setting forth in detail certain illustrative embodiments, these being indicative, however, of but a few of the various ways in which the principle of the invention may be employed.

These and other objects are achieved by means of this invention in which a lithographic printing surface is provided which comprises a support member having a metal surface which has been hydroxylated by coating with a hydroxyl containing water-dispersible aminoformaldehyde resin, a light-sensitive coating and an intermediate hydrophilic barrier layer which is the reaction product of the hydroxylated metal surface and a metal ester of the type to be described hereinafter. As will be seen from the working examples and description which follow, such printing surfaces may be prepared by a relatively simple process and are capable of being used in standard lithographic processes for the production of many copies without loss of reproducibility in the image areas.

The support or backing member for the lithographic surface may, in general, be any of the standard metal or metal surfaced plates which are commonly used in lithographic printing so long as it has a substantially uniform surface on at least one side to which the sublayer of this invention may be applied and firmly retained. Aluminum and zinc are generally the preferred metals.

According to this invention, the hydroxylated surface is provided by applying a coating of a hydroxyl containing water-dispersible aminoformaldehyde resin which may be a urea or melamine formaldehyde resin to the metal surface. One such material and the process of producing it are described in U.S. Patent 2,616,874, and accordingly reference may be made to this patent for a more complete description. In general, such material is in the nature of a polyethylene amine compound which has been reacted with urea to give a ureido substituted polyethylene amine which is then reacted with formaldehyde to substitute methylol groups for the hydrogen atoms of the amine groups, which thus provides numerous hydroxyl groups on the surface of the support member to which the subsequently applied metal esters may bond.

The water-dispersible resin is preferably applied to a clean surface of the support member in an aqueous dispersion after which the excess resin may be rinsed off with running water. In the preferred process, the resin is applied as an aqueous dispersion containing from about 0.1 to about 20.0 percent by weight of the resin, and the support member is treated with this solution for preferably from about 10 seconds to about 5 minutes. The temperature of the dispersion is lower than the boiling point of water and is preferably applied at room temperature, although higher temperatures may be used, up to about 185° F.

The metal esters used in the present invention are commonly referred to as "ortho esters" and in general have the formula $(RO)_4M$, wherein R is a monovalent hydrocarbon radical selected from the group consisting of aryl radicals, such as phenyl, tolyl, xylyl; and all aliphatic radicals of one to eight carbon atoms, including alkyl, isoalkyl, alkylene, isoalkylene, alkenyl, isoalkenyl radicals without regard to degree of saturation or spatial isomerism; and wherein M is a metal selected from the group consisting of titanium and zirconium. Of these compounds, the tetraalkyl metal esters are generally preferred, and of these, tetraisopropyl titanate and tetraisopropyl zirconate have been found to be very suitable.

The method of preparing such metal esters is known, and reference may be made, for example, to U.S. Patent 2,187,821, for such a description. As described therein one method of preparation comprises reacting an alcohol with a metal halide, such as titanium chloride in the presence of ammonia.

The metal esters of this invention are applied to the hydroxylated metal surface in any convenient organic solvent, with the selection of a particular solvent being primarily a matter of choice. Numerous such solvents are suitable for use in this invention, including aromatic solvents such as benzene, toluene and xylene as well as other solvents such as acetone, methylethyl ketone, tetrahydrofuran and the chlorinated hydrocarbons. A preferred type of solvent comprises the humectants or hygroscopic solvents, as will be explained more completely hereinafter. The humectant solvents include for example, the anhydrous or substantially anhydrous alcohols such as methyl, ethyl, propyl, butyl, isopropyl and isobutyl alcohols, ethylene glycol, diethylene glycol, glycerol, Cellosolve, Cellosolve acetate, Cellosolve butylate, methyl and butyl Cellosolve, Carbitol and butyl Carbitol.

The concentration of the solution of metal ester in organic solvent may be varied but will normally be in the range of about 0.1 to about 10.0 percent by weight of the ester, with the preferred range being from about 0.5 to approximately 5.0 percent by weight. The metal ester solution may be applied by any of the standard techniques, such as roller coating, whirler coating, dipping, etc. The solution should remain in contact with the plate for approximately 5 seconds to about 10 minutes, and preferably from about 5 seconds to about 5 minutes. The solution is normally applied at room temperature although higher temperatures may be used as for example up to about 185° F. The time and temperature will, of course, vary with the particular metal ester and concentration of the solution.

After application of the metal ester to the hydroxylated metal surfaced support, the plate is preferably dried to drive off the solvent and dry down any excess solution which may have been left on the surface in order to avoid accumulating powdery titanium or zirconium oxide on the surface of the plate. If desired, heat may be used to facilitate the drying, for example, by heating to about 150° C. to about 180° C. for from about 4 to about 7 minutes.

When the metal ester solution is applied to the hydroxylated metal surface, there is a chemical reaction upon hydrolysis at least at the interface between the hydroxyl groups of the aminoformaldehyde resin and the metal ester to provide a sublayer which is tightly bonded to the support member. The exact nature of the chemical reaction is not completely understood, but it is believed that the reaction product is in the nature of a titanate or zirconate which is bonded to the metal surface through an oxygen or nitrogen atom of the aminoformaldehyde resin.

After the metal ester has been applied, it must undergo a hydrolysis treatment to provide the desired reaction product. The metal esters defined herein are of the type which will hydrolyze readily and absorb moisture from the air for this purpose if none is otherwise available. Accordingly, hydration may be positively promoted by providing a supply of water, or alternatively the hydration may be permissive, that is allowed to occur due to the moisture in the atmosphere. The hydrolysis mechanism is believed to involve the formation of an intermediate complex between the metal ester and water, although the hydroxy ester cannot be isolated as it immediately reacts to produce a dimer.

Hydrolysis of the titanate or zirconate will proceed in a stepwise manner, unless otherwise prevented until a clear amorphous film of the oxide is produced. Presence of the oxide, however, is detrimental for lithographic purposes and does not make an acceptable sublayer, as the metal oxides fail to provide the necessary hydrophilic character and also, the whitish oxide powder will flake free from the plate which results in "pinholes" in the prints subsequently produced from the plate.

To prevent formation of titanium or zirconium oxide, the hydrolysis reaction may be propagated preferably by the use of heat to build large polymeric molecules of the titanate or zirconate which are effective to resist complete hydrolysis to the objectionable metal oxide. If heat is applied for this purpose, the upper limit of the heating will, of course, be determined by the charring point of the materials themselves and by the annealing point of the metal of the support member.

As indicated previously, the metal ester is applied as a solution in an organic solvent in a concentration of from about 0.1 to about 10 percent by weight of the ester. It has been found, under certain circumstances, that when solutions of greater concentrations are used, a white precipitate of the metal oxide may form on the exposed surface of the sublayer. Where the precipitate remains, the subbase will not satisfactorily retain a coating of a light-sensitive material and often the light-sensitive coating will break away from the surface of the metal plate. However, even if an excess of metal ester is applied, the plate may be washed with a solvent, such as isopropanol, which will remove a sufficient amount of the ester to place the actual deposition of the metal ester within a range which permits hydrolysis with polymerization to a state short of hydrolysis to the objectionable oxide.

Since the presence of water aids in promoting the hydrolysis recation, hygroscopic or humectant solvents, i.e., solvents which will absorb moisture from an ambient atmosphere, are preferably employed. The use of such solvents assures sufficient water for the hydrolysis reaction. When the solvent is not a humectant, however, such as toluene, the solvent must first be substantially evaporated after deposition of the solution on a plate before hydrolysis of the metal ester can take place.

After hydrolysis, the plate may be stored for later use or alternatively may be used immediately by applying thereto a coating of a light-sensitive material. The light-sensitive material which may be used in this invention may be any of the usual materials including diazo compounds, bichromated casein, bichromated albumin, gelatin, etc. Other light-sensitive materials may also be used, including halogenated polyvinyl alcohol in aqueous dispersions or solutions as described in U.S. Patents 2,179,245, 2,199,865 and 2,342,175. Dispersions or solutions of protein such as casein described in U.S. Patents 2,324,197, 2,324,198 and 2,500,453 may also be used, as well as the ferric iron light-sensitive systems described in Adams and Sorkin Patent 3,169,065. All of these materials are capable of reacting with light and particularly ultraviolet light such as through a transparency to form a lithographic printing plate.

Referring to the diazo materials which have been found to be suitable light-sensitive materials, numerous such light-sensitive diazo materials may be used. One particular suitable material is the condensation product of paraformaldehyde with p-diazo diphenyl amine sulfate described in U.S. Patents 2,679,498 and 2,100,063. Additional examples of suitable such diazo compounds are described in U.S. Patents 2,063,631, 2,667,415, 2,692,827, 2,714,066, 2,773,779, 2,778,735, 2,958,599 and 3,030,210.

The dispersion or solution of the sensitizer or light-sensitive material may be applied to the prepared base by dipping, spraying roller coating, brushing or other conventional means.

The plate may be exposed to any standard source of actinic light, preferably ultraviolet light, and the exposure time will generally be equivalent to about 10 to 100 lux units at 3,000 foot candles, although the time and exposure may vary. A luxometer (lux) is a common analytical unit for measuring cumulative quantities of light in terms of intensity time units and as used herein is equal to 13,000 foot candles seconds of illumination, wherein the intensity of light is at least 2,000 foot candles supplied by a white flame carbon arc source.

The invention will be better understood by reference to the following specific but non-limiting examples.

*Example I*

An aluminum sheet of the standard type used to prepare lithographic plates was cleaned of surface grease and other contaminants by immersion for about 2 minutes in an aqueous solution of trisodium phosphate at about 160° F. The plate was thereafter washed for about 2 minutes with tap water and was subsequently immersed for another 2 minutes in a desmutting bath comprising a mixture of 2 percent chromic acid and 0.8 percent sulfuric acid.

The plate was again rinsed with water and immersed into an 0.55 percent aqueous dispersion of a hydroxyl containing ureaformaldehyde resin at room temperature. The ureaformaldehyde resin was of the type previously described and was purchased commercially under the "Uformite" trademark. The plate remained in the solution for approximately 2 minutes.

After application of the ureaformaldehyde coating, the plate was washed and dried by use of infrared heat. The plate was thereafter dipped into a 1 percent solution of tetraisopropyl titanate in isopropanol. The solution was at approximately room temperature and the plate was maintained in the solution for approximately 5 minutes. The plate was then dried under infrared lamps at a temperature of about 150° C. and subsequently dipped into a 2 percent aqueous solution of Fairmount Chemical Co.'s Diazo Resin #4. The plate was thereafter dried and exposed through a suitable negative transparency for approximately 30 lux units to an ultraviolet light source.

After exposure, the plate was desensitized with Harris 125 desensitizing solution and lacquered with Harris 201 black lacquer to remove the non-light exposed diazo surface and to provide printing and non-printing areas on the surface of the plate. The plate of this example was subsequently used in a lithographic press for normal printing operations and was found to be a very clean running plate.

*Example II*

The general procedure of Example I was followed. After cleaning and application of the hydroxyl containing ureaformaldehyde resinous coating, the plate was rinsed and dried after which it was dipped into a 1.5 percent solution of tetraisopropyl titanate in anhydrous ethylene glycol at room temperature for approximately 2 minutes. The plate was thereafter dried after which an aqueous dispersion of bichromated casein was coated over the subbase to sensitize the plate. The plate was next air dried and then exposed through a negative transparency for 80 lux units to an ultraviolet source.

After exposure, the plate was desensitized and lacquered as in Example I and subsequently used in a press. It was found to produce copies of satisfactory quality in both the image and background areas.

*Example III*

The general procedure of the preceding examples was followed in which an aluminum plate was cleaned with an aqueous solution of trisodium phosphate and rinsed for approximately 2 minutes. It was thereafter desmutted with a 70 percent aqueous solution of nitric acid at room temperature. After again rinsing with tap water for about 2 minutes, the plate was immersed in a 1.0 percent aqueous dispersion of hydroxyl containing melamine formaldehyde (purchased commercially under the "Accobond" trademark). The dispersion was at room temperature and the plate remained immersed therein for approximately 2 minutes. After rinsing and drying, the plate was next immersed in an 0.1 percent by weight room temperature solution of tetra-n-octyl zirconate in isopropanol. After remaining in the solution for approximately 2 minutes, the plate was removed, dried and subsequently dipped into a 2.0 weight percent solution of Fairmount Chemical Co.'s Diazo Resin #4.

The plate was subsequently exposed through a negative transparency for approximately 80 lux units to an ultraviolet light source after which it was desensitized and lacquered as in the preceding examples. The plate was thereafter used to make reproductions and copies of satisfactory quality were obtained.

*Example IV*

In this example, a positive working plate was prepared. A clean aluminum plate was dipped in a 0.55 weight percent aqueous dispersion of the "Uformite" ureaformaldehyde resin for approximately 2 minutes, after which it was removed therefrom, rinsed and dried. The plate was then dipped into a 1.0 weight percent solution of tetraisopropyl titanate in isopropanol at room temperature for approximately two minutes.

After drying, the plate base was roller coated with a 1.5 weight percent solution of diazo resin corresponding to Example I of U.S. Patent 2,958,599, in ethylene glycol monomethyl ether. After drying, the plate was exposed for 80 lux units through a positive transparency to an ultraviolet light source thus producing a positive image on the surface of the plate. After exposure, the plate was developed with a 3 percent aqueous trisodium phosphate solution and was finally rinsed with water to remove the water soluble material. This plate was subsequently used in a lithographic press and copies were obtained with clear and distinct images thereon.

Lithographic printing surfaces produced in accordance with the present invention thus have an adherent barrier coating which seals the surface of the base member and precludes contact between the support and the subsequently applied light-sensitive coating. The barrier layer is also hydrophilic and oleophobic so as to be scum preventing and to reduce tone in the resulting printing plate and retains its hydrophilic character over extended periods of time.

The subbase of this invention in which a hydroxyl containing water-dispersible aminoformaldehyde resin is applied to a metal surfaced support to provide the necessary hydroxylated metal surface possesses certain significant advantages in that the metal surface is thus completely covered by a polymeric film which makes it possible to obtain a more complete and more uniform subbase coating on the surface of the support member when the metal ester is subsequently applied and reacted with the aminoformaldehyde resin. Moreover, it has been found that the use of such a resinous coating provides a very good bond with the metal ester so as to yield a sublayer which s very firmly adhered to the support member. The sub- )ase of this invention also has the additional advantage n that it is relatively easy to produce, since irregularities n the surface of the metal plate, i.e., pitted areas, unclean ;urfaces, etc., are of minor concern since the resinous film :overs the metal surface prior to application of the metal ester.

Other modes of applying the principle of the invention nay be employed, change being made as regards the letails described, provided the features stated in any of :he following claims, or the equivalent of such, be em- )loyed.

We therefore particularly point out and distinctly claim as our invention:

1. A plate for use in lithographic printing comprising a metal surfaced support member and a hydrophilic barrier coating on said support comprising the reaction product of a hydroxyl containing water-dispersible aminoformaldehyde resin selected from the group consisting of ureaformaldehyde and melamine formaldehyde resins and a metal ester having the formula $(RO)_4M$, wherein R is a monovalent hydrocarbon radical selected from the group consisting of phenyl, tolyl, xylyl and aliphatic radicals having from 1 to 8 carbon atoms and M is a metal selected from the group consisting of titanium and zirconium.

2. The plate of claim 1 in which said metal surfaced support member is selected from the group consisting of aluminum and zinc.

3. The plate of claim 1 in which said metal ester is tetraisopropyl titanate.

4. A lithographic plate comprising a metal surfaced support member, a hydrophilic barrier coating on said support member comprising the reaction product of a hydroxyl containing water-dispersible aminoformaldehyde selected from the group consisting of ureaformaldehyde and melamine formaldehyde resins and a metal ester having the formula $(RO)_4M$ wherein R is a monovalent hydrocarbon radical selected from the group consisting of phenyl, tolyl, xylyl and aliphatic radicals having from 1 to 8 carbon atoms and M is a metal selected from the group consisting of titanium and zirconium, and a light-sensitive layer over said hydrophilic barrier coating.

5. The plate of claim 4 in which said metal surface is selected from the group consisting of aluminum and zinc.

6. The plate of claim 4 in which said metal ester is tetraisopropyl titanate.

7. A process of forming a sublayer on a lithographic plate base comprising applying a coating from an aqueous dispersion of a water-dispersible hydroxyl containing aminoformaldehyde resin selected from the group consisting of ureaformaldehyde and melamine formaldehyde resins to a support member, applying a coating of a solution of a metal ester in an organic solvent to said resinous coating, said ester having the formula $(RO)_4M$ wherein R is is a monovalent hydrocarbon radical selected from the group consisting of phenyl, tolyl, xylyl and aliphatic radicals having from 1 to 8 carbon atoms and M is a metal selected from the group consisting of titanium and zirconium, said metal ester solution containing sufficient metal ester to deposit an amount of such ester on said surface equivalent to that deposited by contacting the plate with an about 0.1 to about 10 weight percent solution for a period of time up to approximately 10 minutes, hydrolyzing and condensing said ester on said plate while reacting said ester with the hydroxyl groups of said aminoformaldehyde resinous coating, said reaction product being hydrophilic, substantially free of oxides of M and substantially non-susceptible to further hydrolysis.

8. The process of claim 7 in which said metal ester is tetraisopropyl titanate.

9. A process of forming a lithographic plate comprising applying a coating from an aqueous dispersion of a water-dispersible hydroxyl containing aminoformaldehyde resin selected from the group consisting of ureaformaldehyde and melamine formaldehyde resins to a support member, applying a coating of a solution of a metal ester in an organic solvent to said resinous coating, said ester having the formula $(RO)_4M$ wherein R is a monovalent hydrocarbon radical selected from the group consisting of phenyl, tolyl, xylyl and aliphatic radicals having from 1 to 8 carbon atoms and M is a metal selected from the group consisting of titanium and zirconium, said metal ester solution containing sufficient metal ester to deposit an amount of such ester on said surface equivalent to that deposited by contacting the plate with an about 0.1 to about 10 weight percent solution for a period of time up to approximately 10 minutes, hydrolyzing and condensing said ester on said plate while reacting said ester with the hydroxyl groups of said aminoformaldehyde resinous coating, said reaction product being hydrophilic, substantially free of oxides of M and substantially non-susceptible to further hydrolysis, and subsequently applying a coating of a light-sensitive material over said reaction product.

No references cited.

NORMAN G. TORCHIN, *Primary Examiner.*

A. D. RICCI, *Assistant Examiner.*